(12) United States Patent
Rune et al.

(10) Patent No.: US 10,306,519 B2
(45) Date of Patent: May 28, 2019

(54) METHOD FOR PROVIDING AN APPLICATION SERVICE IN A CELLULAR NETWORK

(71) Applicant: Telefonaktiebolaget LM Ericsson (publ), Stockholm (SE)

(72) Inventors: Johan Rune, Stockholm (SE); Lars Westberg, Stockholm (SE); Vinay Yadhav, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/538,229

(22) PCT Filed: Dec. 22, 2014

(86) PCT No.: PCT/EP2014/078999
§ 371 (c)(1),
(2) Date: Jun. 21, 2017

(87) PCT Pub. No.: WO2016/101974
PCT Pub. Date: Jun. 30, 2016

(65) Prior Publication Data
US 2017/0347295 A1 Nov. 30, 2017

(51) Int. Cl.
*H04W 36/00* (2009.01)
*H04W 36/24* (2009.01)

(52) U.S. Cl.
CPC ..... *H04W 36/0033* (2013.01); *H04W 36/005* (2013.01); *H04W 36/245* (2013.01)

(58) Field of Classification Search
CPC ........... H04W 36/0033; H04W 36/245; H04W 36/005
See application file for complete search history.

(56) References Cited

U.S. PATENT DOCUMENTS

2008/0280615 A1 11/2008 Vinayakray-Jani
2009/0216906 A1* 8/2009 Weniger ............... H04L 41/147
                                                                    709/246
(Continued)

FOREIGN PATENT DOCUMENTS

WO WO-2005027558 A1 * 3/2005 ........ H04W 36/0033
WO    2014008955 A1    1/2014
(Continued)

OTHER PUBLICATIONS

Mell, P., "The NIST Definition of Cloud Computing, Recommendations of the National Institute of Standards and Technology", NIST Special Publication 800-145, Sep. 2011, pp. 1-7.
(Continued)

*Primary Examiner* — Kamran Afshar
*Assistant Examiner* — Minjung Kim
(74) *Attorney, Agent, or Firm* — Sage Patent Group

(57) ABSTRACT

At least one application service is provided to a user equipment (10), utilizing an application service platform (150A) at an access node (110A) of a cellular network and a further application service platform (150A) at a further access node of the cellular network. A parameter is determined which is indicative of a delay associated with transfer of context data from the application service platform (150A) to the further application service platform (150B) in one or more handover messages controlling a handover of the user equipment (10) from the access node (110A) to the further access node (110B). The context data are associated with at least one user session of the at least one application service provided to the user equipment (10). Depending on the determined delay, migration of the user session from the application service platform (150A) to the further application service platform (150B) is controlled.

15 Claims, 10 Drawing Sheets

(56) References Cited

U.S. PATENT DOCUMENTS

| | | | | |
|---|---|---|---|---|
| 2010/0067483 A1* | 3/2010 | Ahluwalia | ............ | H04W 36/02 370/331 |
| 2014/0185435 A1* | 7/2014 | Park | ...................... | H04W 36/32 370/229 |
| 2014/0280470 A1* | 9/2014 | Calo | ..................... | H04L 67/148 709/203 |
| 2014/0378145 A1* | 12/2014 | Legg | ................. | H04W 36/0083 455/437 |

FOREIGN PATENT DOCUMENTS

| | | |
|---|---|---|
| WO | 2015084230 A1 | 6/2015 |
| WO | 2016036293 A1 | 3/2016 |

OTHER PUBLICATIONS

3rd Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)", 3GPP TS 29.274 V12.5.0, Jun. 2014, pp. 1-310.

3rd Generation Partnership Project, "Technical Specification Group Radio Access Network; Evolved Universal Terrestrial Radio Access Network (E-UTRAN); X2 application protocol (X2AP) (Release 12)", 3GPP TS 36.423 V12.2.0, Jun. 2014, pp. 1-151.

3rd Generation Partnership Project, "Technical Specification Group Radio Access Network; Evolved Universal Terrestrial Radio Access Network (E-UTRAN); S1 Application Protocol (S1AP) (Release 12)", 3GPP TS 36.413 V12.2.0, Jun. 2014, pp. 1-285.

* cited by examiner

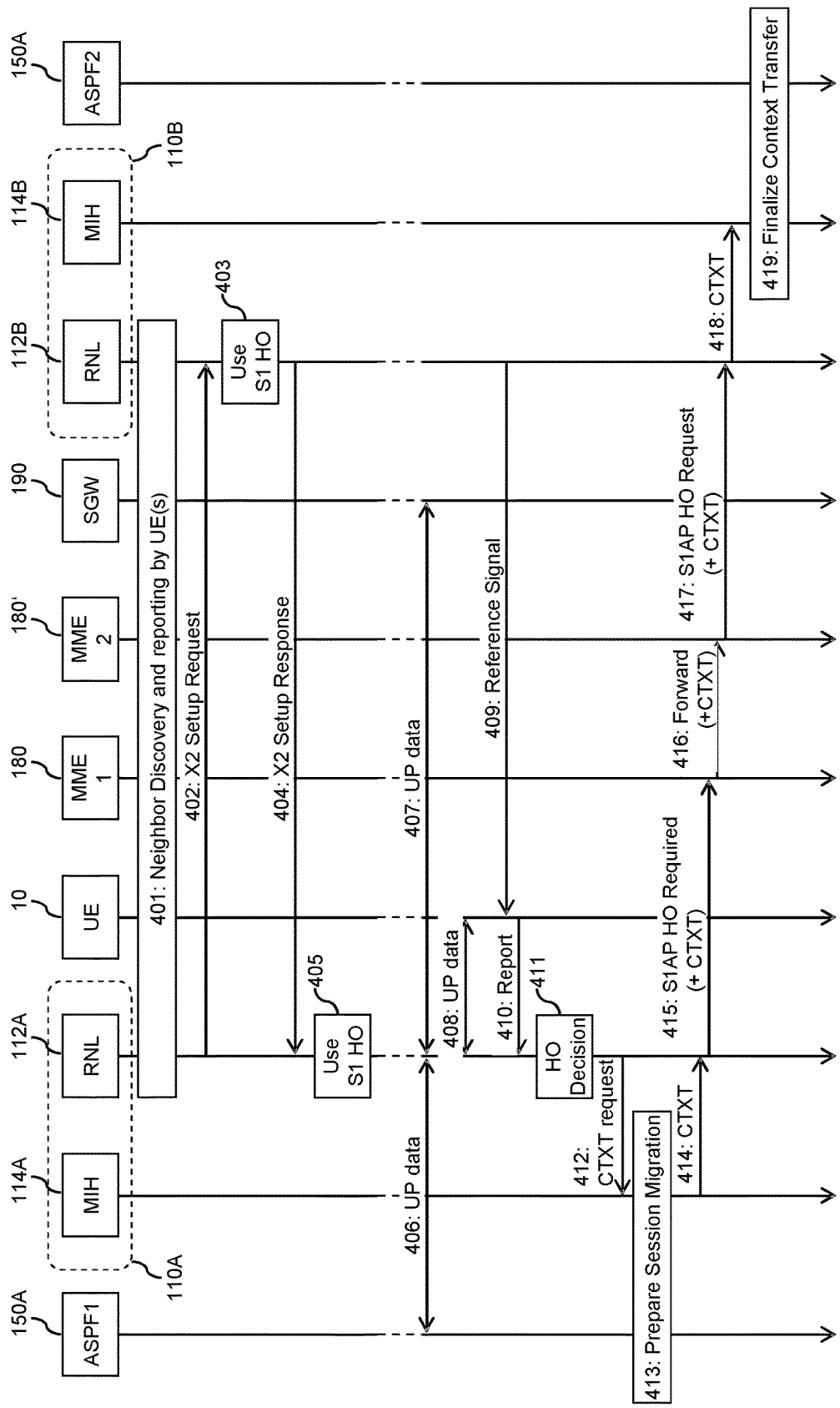

METHOD FOR PROVIDING AN APPLICATION SERVICE IN A CELLULAR NETWORK

TECHNICAL FIELD

The present invention relates to methods for providing an application service in a cellular network and to corresponding devices.

BACKGROUND

In cellular networks, it is known to provide various kinds of application services. Conventionally, such application services are provided by an application server, and a user may access such application services through a user equipment (UE) connected to the cellular network.

In this connection, an idea that is gaining increased attention is the possibility to deploy a cloud platform for application services closer to the users in cellular networks, in particular in a radio access network (RAN) part of the cellular network. Such cloud service platform may be implemented by multiple application service platforms distributed over different sites in the RAN. Accordingly, when the UE is connected to a given access node of the RAN, the application service platform which is closest to this access node may be utilized for providing the application services to the UE. This may help to reduce the amount of transport network bandwidth required for the traffic associated with the application services. Further, also a better user experience may be achieved, e.g., by allowing for reduced round-trip delays or smart interactions between the cloud platform and network elements.

Mobility of the UE in the cellular network may also require migration of established user sessions of the application services between the application service platforms at different sites in the RAN. For example, in WO2014/008955 A1 it is described that upon handover (HO) of a UE from a first access node to a second access node, a context of the UE is moved from an application service platform at the first access node to an application service platform at the second access node. For this purpose, the context data of the application service platform may be conveyed in a Handover Request message, in particular in an information element referred to as "Source eNB to Target eNB Transparent Container".

SUMMARY

However, the Applicant has appreciated that in some scenarios conveying the context data in the Handover Request message may cause undesirable effects. For example, due to the additionally included data, transferring the Handover Request message make take longer, and completion of the HO may thus be delayed, with the risk of dropping the connection to the UE.

Accordingly, there is a need for techniques which allow for efficiently transferring an application service context between application service platforms when performing a HO of a UE.

According to an embodiment of the invention, a method is provided. The method may be applied for providing at least one application service to a UE. This is accomplished via an application service platform at (associated with) an access node of a cellular network and a further application service platform at (associated with) a further access node of the cellular network. According to the method, a parameter is determined which is indicative of a delay associated with transfer of context data from the application service platform to the further application service platform in one or more HO messages controlling a HO of the UE from the access node to the further access node. The context data are associated with at least one user session of the at least one application service provided to the UE. Depending on the determined delay, migration of the at least one user session from the application service platform to the further application service platform is controlled.

According to a further embodiment of the invention, an access node for a cellular network is provided. The access node comprises an interface to an application service platform for providing at least one application service to a user equipment. Further, the access node comprises at least one processor. The at least one processor is configured to determine a parameter which is indicative of a delay associated with transfer of context data between the application service platform and a further application service platform at a further access node in one or more handover messages controlling a HO of the UE between the access node and the further access node. The context data are associated with at least one user session of the at least one application service provided to the UE. Further, the at least one processor is configured to control, depending on the determined parameter, migration of the at least one user session between the application service platform and the further application service platform.

According to a further embodiment of the invention, a network node is provided which comprises the above-mentioned access node and further comprises the above-mentioned application service platform.

According to a further embodiment of the invention, a computer program or computer program product is provided, e.g., in the form of a non-transitory storage medium, which comprises program code to be executed by at least one processor of an access node of a cellular network. Execution of the program code causes the at least one processor to determine a parameter which is indicative of a delay associated with transfer of context data between the application service platform and a further application service platform at a further access node in one or more handover messages controlling a HO of the UE between the access node and the further access node. The context data are associated with at least one user session of the at least one application service provided to the UE. Further, execution of the program code caused the at least one processor to control, depending on the determined parameter, migration of the at least one user session between the application service platform and the further application service platform.

Details of such embodiments and further embodiments will be apparent from the following detailed description of embodiments.

BRIEF DESCRIPTION OF THE DRAWINGS

FIGS. 4A and 4B show a further exemplary signaling flow of a handover in which a context of a user session of an application service is transferred in a handover request message.

DETAILED DESCRIPTION OF EMBODIMENTS

Figure 1:
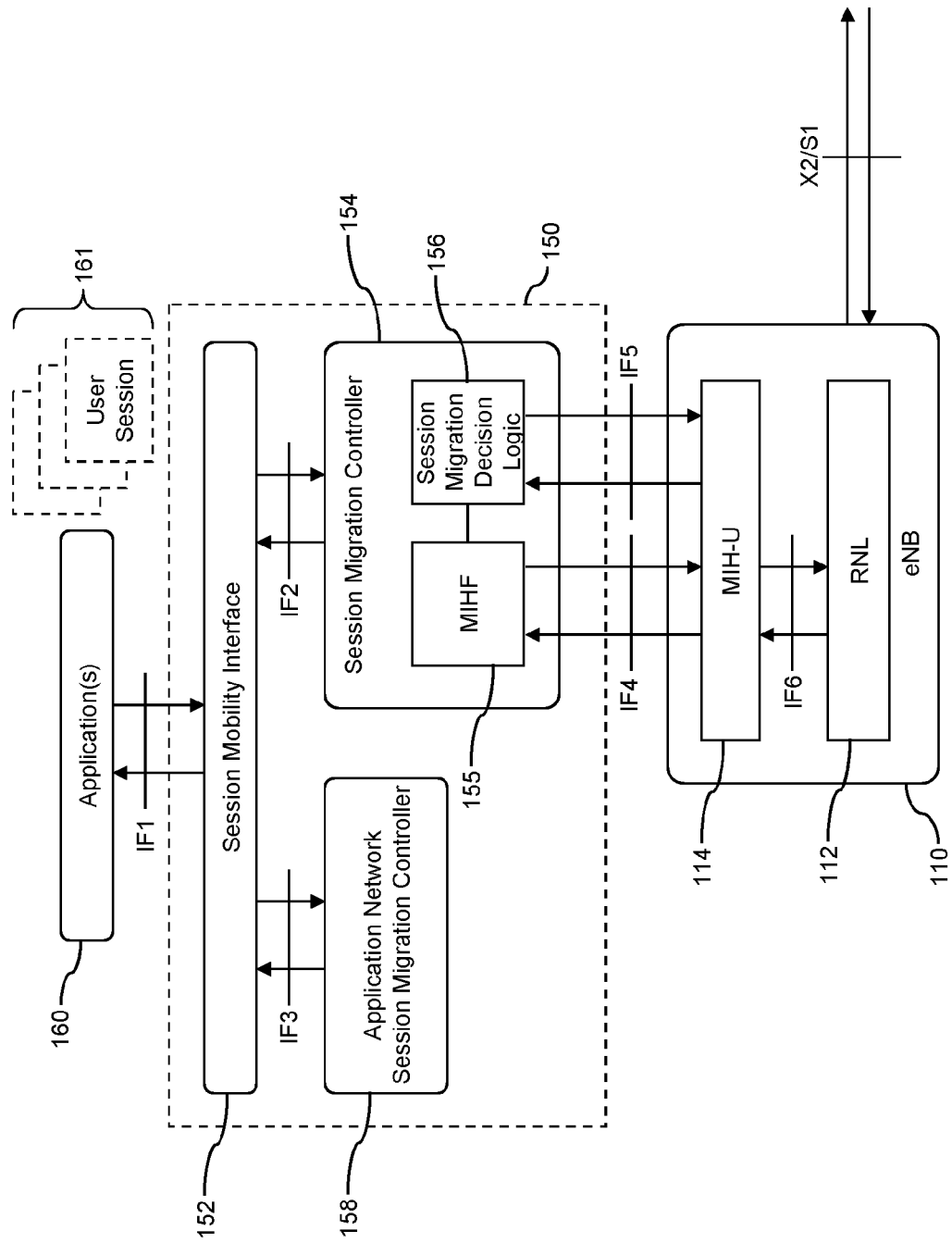
FIG. 1 schematically illustrates an architecture as applied according to an embodiment of the invention for providing an application service platform at an access node.

In the following, concepts in accordance with exemplary embodiments of the invention will be explained in more detail and with reference to the accompanying drawings. The illustrated embodiments relate to providing one or more application services in a cellular network, utilizing application service platforms located at different access nodes of the cellular network. The application service platforms may form a Local Service Cloud (LCS) and be applied within a Platform as a Service (PaaS) model of cloud computing, i.e., the capability provided to the user is to deploy onto the cloud infrastructure user-created or acquired applications created using programming languages, libraries, services, and tools supported by the provider. The user does not manage or control the underlying cloud infrastructure including network, servers, operating systems, or storage, but has control over the deployed applications and possibly configuration settings for the application-hosting environment. However, other models of providing application services by multiple distributed application service platforms could be applied as well. In the illustrated examples, it is assumed that cellular network is implemented on the basis of LTE (Long Term Evolution) radio access technology as specified by 3GPP ($3^{rd}$ Generation Partnership Project). However, it should be understood that the concepts could also be applied in connection with other radio access technologies, e.g., UMTS (Universal Mobile Telecommunications System) or CDMA2000.

In the illustrated concepts, processes of migrating one or more user sessions of one or more application services from one application service platform to another application service platform may be combined in a selective manner with mobility mechanisms of the cellular network. In the following, examples will be further illustrated which assume that application service platforms are co-located with or integrated in access nodes of the cellular network, in accordance with the illustrated LTE scenario referred to as eNB (evolved Node B). However, it is to be understood that the concepts may also be applied in scenarios in which the application service platforms are distributed at more centralized locations, e.g., at sites of transport network hubs of the RAN. According to the illustrated concepts, interfaces of such access nodes may be utilized in a delay-aware manner for conveying context data of migrated user sessions. Specifically, the migration of the user sessions is controlled depending on an expected delay associated with the transfer of the context data in one or more HO messages used for controlling a HO of the UE from one access node to another access node. In some scenarios, the transfer of the context data in the HO message(s) is only applied if the expected associated delay is not too high, e.g., below a threshold. Further, in some scenarios one or more parameters for triggering the HO may be adapted in response to the expected delay being too high, e.g., above a threshold. This may allow for triggering the HO earlier and thus improving the chance of successfully completing the HO even if transferring of the HO message(s) takes longer due to the included context data.

FIG. 1 shows an example of an architecture which may be utilized at the site of a certain eNB 110. The architecture may be utilized for implementing a network node which combines functionalities of the eNB 110 and an application service platform 150. Here, it should be understood that such network node may be implemented as a single device or a system of multiple interacting devices.

More specifically, FIG. 1 shows the eNB 110, the application service platform 150, and one or more applications 160 executed on the application service platform 150. The applications 160 have the purpose of providing the application service(s) to users which utilize UEs connected to the cellular network. For this purpose, corresponding application client software may be installed on the UEs. Examples of such application services which may be provided by the application 160 executed on the application service platform 150 include social networking services, media streaming or sharing services, and messaging services. FIG. 1 also illustrates exemplary user sessions 161 of the application service(s). Here, it should be understood that the user sessions 161 may include multiple user sessions of different application services or multiple user sessions of the same application service. Further, the multiple user sessions may relate to the same user or to multiple different users. However, in order to simplify the following explanations, it will be assumed that the user sessions 161 are established by the same user, using the same UE. The user sessions 161 may then relate to different application services. However, it is also conceivable that the same user simultaneously established multiple user sessions of the same application service, e.g., multiple simultaneous media streaming sessions or multiple simultaneous messaging sessions.

As illustrated, the application service platform 150 is provided with a session mobility interface 152, a session migration controller 154, and an application network session migration controller 158. The session mobility interface 152 provides a first interface IF1 with respect to the application(s) executed on the application service platform 160. The first interface IF1 may act as an application programming interface (API) for the application(s) 160. This API may for example support freezing execution of the application(s) 160 or communication of information concerning a state of the application(s). Further, the API may also support communication of information concerning the cellular network, as for example available from the eNB 110. The session mobility interface 152 is coupled via a second interface IF2 to the session migration controller 154 and the application network session migration controller 158.

The session migration controller 154 and the application network session migration controller 158 have the purpose of controlling migration of functionalities for providing the application service(s) between the application service platform 150 and other application service platforms in the cellular network. In the case of the session migration controller 154, migration is controlled on a level of the user session(s) 161, which means that the session migration controller 154 controls whether a certain user session 161 or a group of user sessions 161 should be handled by the application service platform 150 or migrated to another application service platform, which may for example occur depending on mobility of the UE through which the user session(s) 161 are established. In the case of the application network session migration controller 158, migration is controlled on a level of the application service(s), which means that the application network session migration controller 158 controls whether a certain application service or group of application services should be handled by the application service platform 150 or migrated to another application service platform. This occurs typically independently of mobility of individual UEs, and may rather consider network conditions, such as available capacities at the different application service platforms. Further, the application network session migration controller 158 may be utilized for communication with lower layer functionalities of the application service platform 150, such as a TCP (Transmission Control Protocol) stack, which are involved in providing an application service to be migrated.

As further illustrated, the session migration controller 154 is provided with a Media Independent Handover function (MIHF) 155 and a session migration decision logic 156. The MIHF 155 has the purpose of coordinating the migration of user sessions handled by the application service platform 150 with mobility mechanisms in the cellular network. For this purpose, a fourth interface IF4 is provided between the MIHF 155 and the eNB 110, in particular between the MIHF 155 and a Media Independent Handover User function (MIH-U) 114 in the eNB 110. The session migration decision logic 156 is responsible for deciding whether to migrate one or more of the user sessions 161 or not. For this purpose, a fifth interface IF5 is provided between the session migration decision logic 156 and the eNB 110, in particular between the session migration decision logic 158 and the MIH-U 114.

The eNB 110 provides the MIH-U 112 which is responsible on the eNB side for coordinating the migration of user sessions handled by the application service platform with the mobility mechanisms in the cellular network. In addition, the eNB 110 provides a radio network layer functionality (RNL) 112 which is responsible for handling typical radio network related functionalities of the eNB 110, such as controlling HOs from or to a cell of the cellular network served by the eNB 110. For supporting the coordination of the migration of user sessions handled by the application service platform 150 with mobility mechanisms in the cellular network, a sixth interface IF6 is provided between the RNL 112 and the MIH-U 114 of the eNB 110. The interface IF6 allows for exchange of information between the functionalities of the eNB 110 related to the provision and migration of application services and the typical radio network related functionalities of the eNB 110.

As further illustrated, the eNB 110 provides one or more interfaces for coupling to other nodes of the cellular network, as illustrated these interfaces may correspond to the X2 interface for inter-eNB communication and/or the S1 interface for communication between eNB and core network as specified in 3GPP TS 36.300 V12.3.0 (2014 September).

Figure 2:
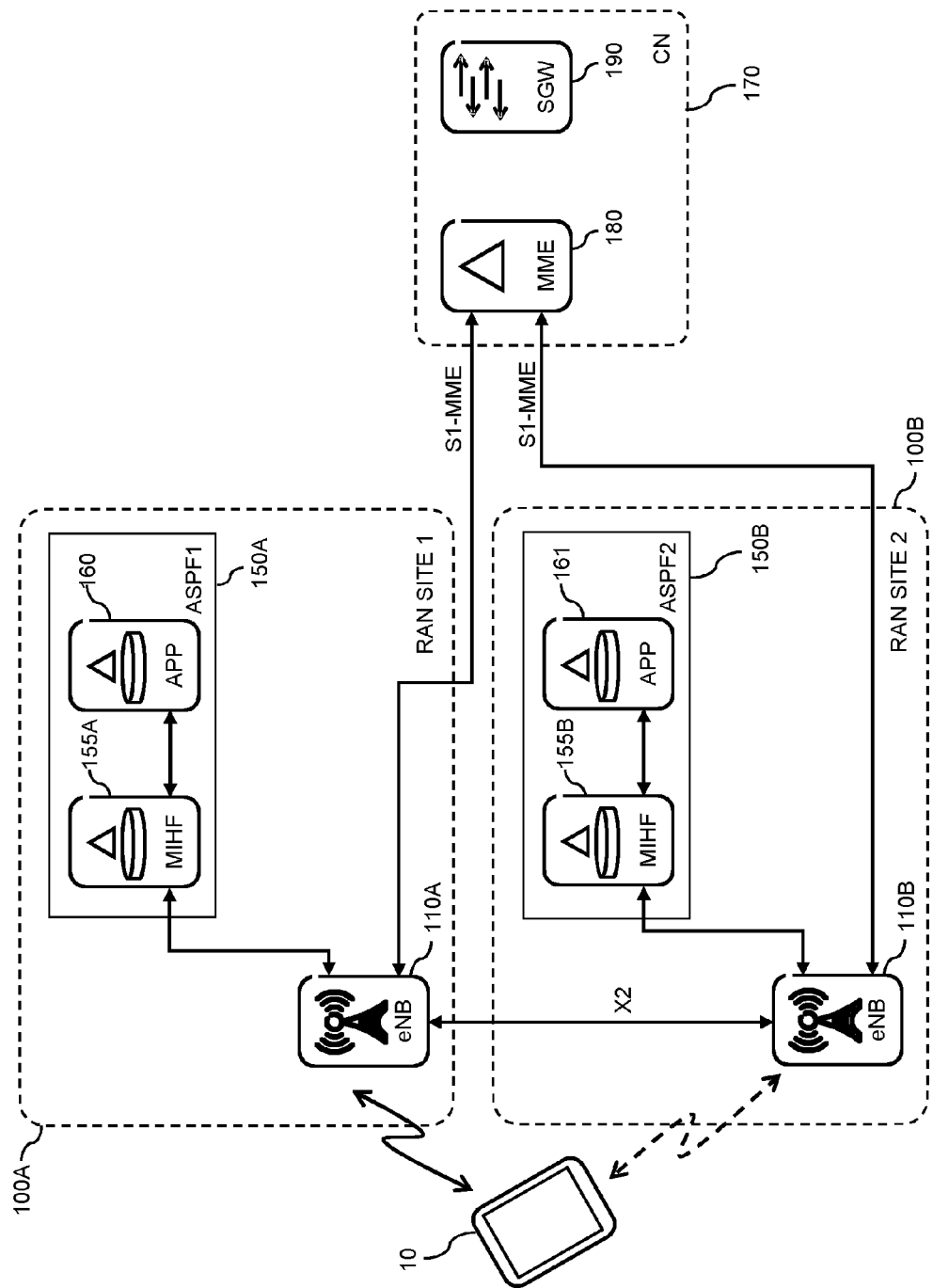
FIG. 2 schematically illustrates a handover scenario as assumed according to an embodiment of the invention.

FIG. 2 schematically illustrates an exemplary scenario of a HO scenario in which the concepts as outlined above may be applied. In the scenario of FIG. 1, a HO of a UE 10 is assumed to be performed from a first RAN site 100A to a second RAN site 100B, which may each be implemented on the basis of the architecture as explained in connection with FIG. 1. FIG. 2 further illustrates elements of a core network (CN) 170 of the cellular network which may be involved in the HO, in particular an MME (Mobility Management Entity) 180 and an SGW (Serving Gateway) 190.

In accordance with the architecture of FIG. 1, the first RAN site 100A thus provides a first eNB 110A, in view of the assumed HO in the following also referred to as source eNB, and a first application service platform (ASPF1) 150A coupled to eNB 110A. Similarly, the second RAN site 100B provides a second eNB 110B, in view of the assumed HO in the following also referred to as target eNB, and a second application service platform (ASPF2) 150B coupled to the second eNB 110B. In accordance with the architecture explained in connection with FIG. 1, the first application service platform 150A is provided with a first MIHF 155A, interacting with a MIH-U (not illustrated) of the first eNB 110A and executes certain application(s) 160. Similarly, the second application service platform 150B is provided with a second MIHF 155B, interacting with a MIH-U (not illustrated) of the second eNB 110B. The second application platform 150B is assumed to and execute the same application(s) 160 as executed by the first application service platform 150A.

Before the HO, the UE 10 is connected via the first eNB 110A to the cellular network, and one or more application services are assumed to be provided by the first application service platform 150A to the UE 10. One or more corresponding user sessions may thus be established by the UE 10 and the first application service platform 150A.

After the HO, the UE 10 will be connected via the second eNB 110B to the cellular network. In view of efficient utilization of transport network capacity and user experience, e.g., with respect to latencies when utilizing the application service(s), migration of the user session(s) from the first application service platform 150A to the second application service platform 150B may thus be desirable. For migration of the user session(s), context data associated with the user session(s) need to be transferred from the first application service platform 150A to the second application service platform 150B. The context data may for example include information on a state of the executed application when the migration is initiated. Further, the context data may also include data currently used by the executed application, e.g., a TCP state including buffered but not yet acknowledged TCP packets.

As mentioned above, the context data may be transferred in one or more HO messages as also applied for controlling the HO of the UE 10 from the first access node 110A to the second access node 110B. Such HO message may for example correspond to a Handover Request message as specified by 3GPP TS 36.423 V12.3.0 (2014 September) for the X2AP (X2 Application Protocol) of the X2 interface, if the HO is an X2 HO controlled by direct interaction of the first eNB 110A and the second eNB 110B via the X2 interface. Further, such HO messages may include a Handover Required message and a Handover Request message as specified by 3GPP TS 36.413 V12.3.0 (2014 September) for the S1AP (S1 Application Protocol) of the S1 interface, if the HO is an S1 HO controlled by interaction of the first eNB 110A and the second eNB 110B with one or more MMEs of the cellular network, such as the MME 180.

The context data may for example be inserted into a certain information element defined for these messages, such as the information element (IE) referred to as "Source eNB to Target eNB Transparent Container". However, other IEs could be utilized as well. In some scenarios, i.e., in the case of the HO involving moving from an area served by one MME (Mobility Management Entity) to an area served by another MME, the HO messages may also include messages for forwarding HO related control signaling between these two MMEs, e.g., messages of the Evolved General Packet Radio Service (GPRS) Tunnelling Protocol for Control plane (GTPv2-C) as specified in 3GPP TS 29.274 V12.6.0 (2014 September).

The utilization of the HO message(s) for transferring the context data is controlled in a delay-aware manner. In particular, it may be taken into account whether conveying the context data in the HO messages(s) excessively delays completion of the HO. If this is the case, an another mechanism of transferring the context data may be applied as an alternative or in addition to transferring the context data in the HO message(s). Further, effects of the delay may be compensated for by adapting one or more control parameters for triggering the HO, to thereby increase the available time for completing the HO. Further details of such delay-aware utilization of the HO message(s) for transferring the context data will be described below.

Figure 3A:
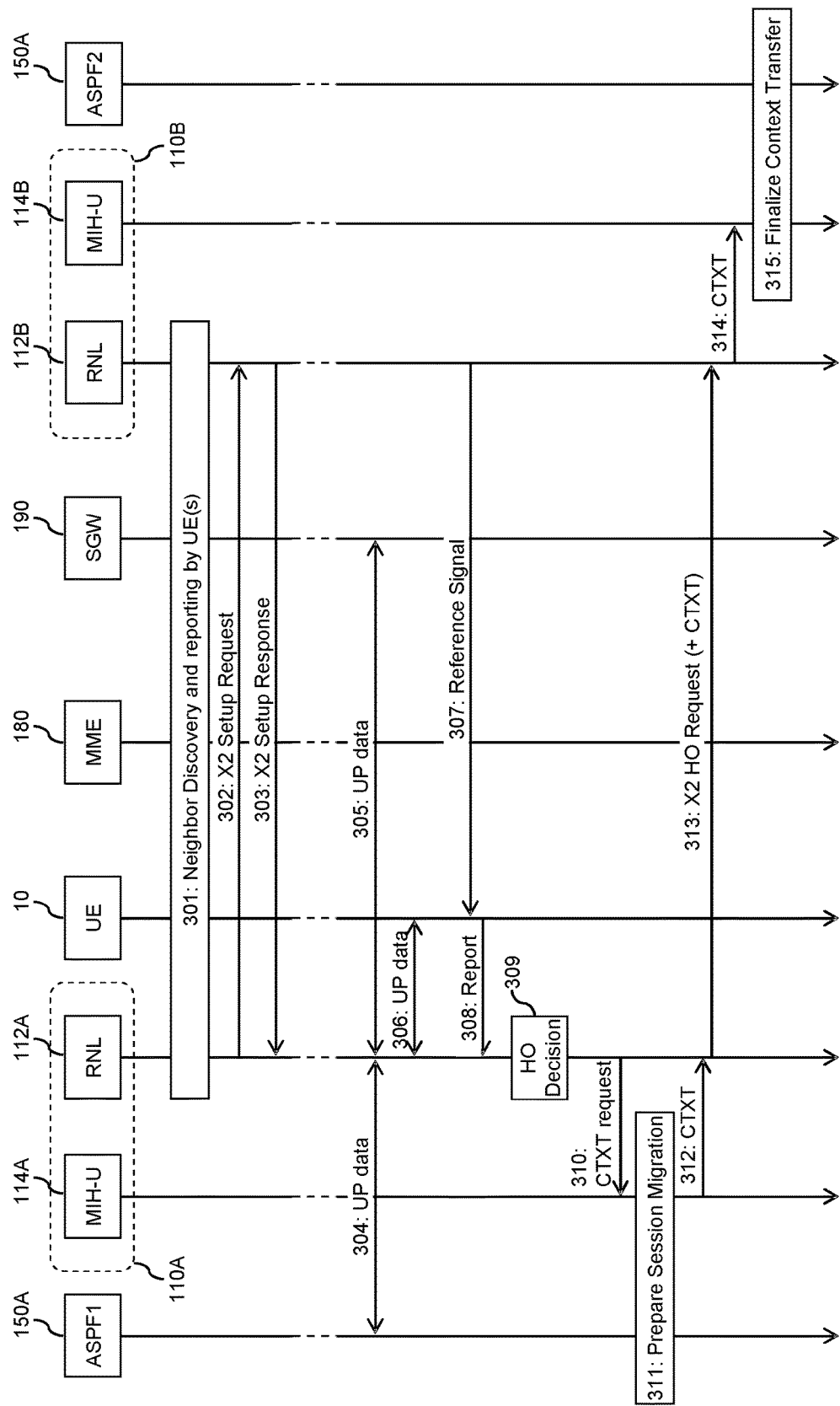
FIGS. 3A and 3B show an exemplary signaling flow of a handover in which a context of a user session of an application service is transferred in a handover request message.
Figure 3B:
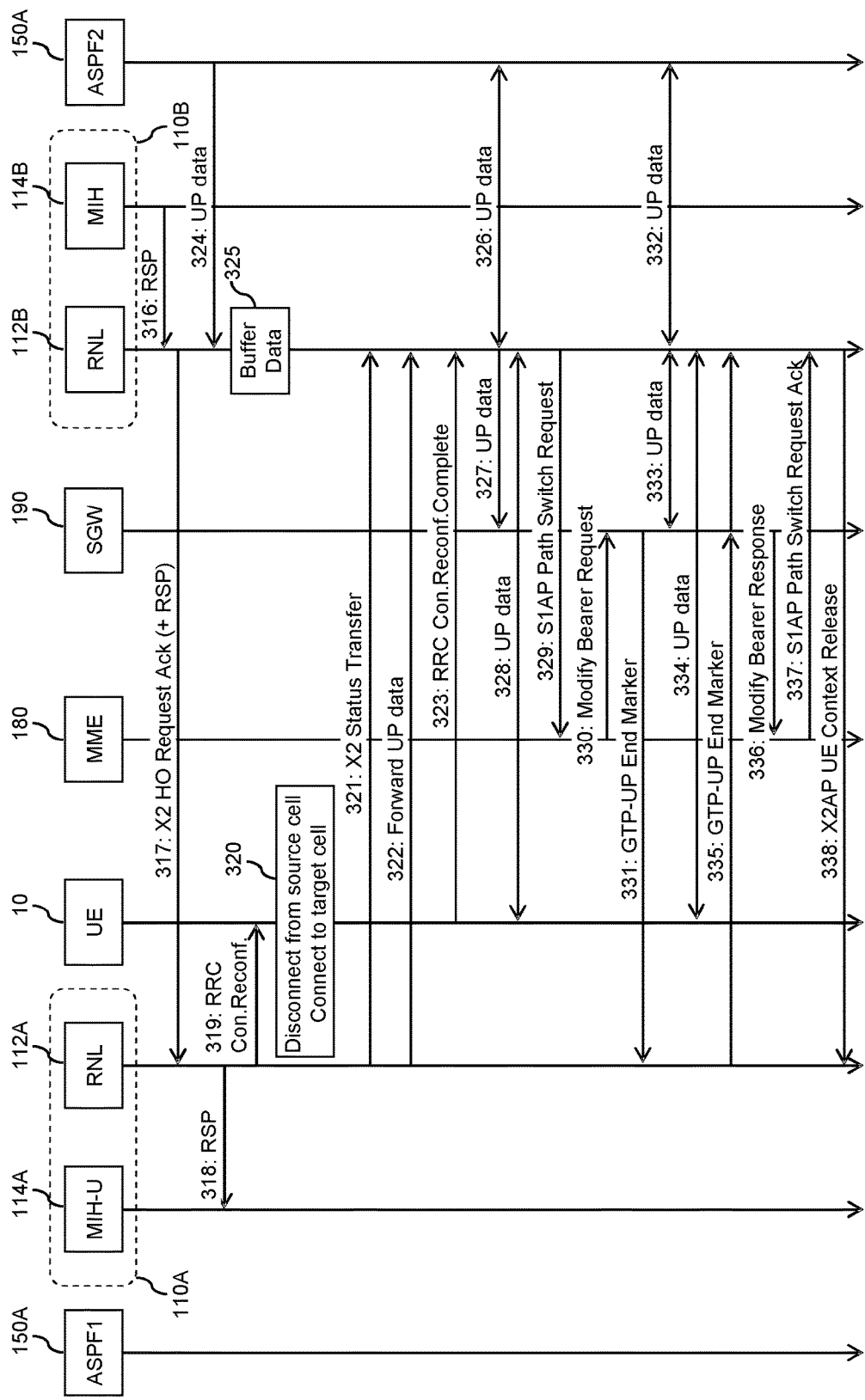

FIGS. 3A and 3B show a signaling flow of processes applied when utilizing a HO message of an X2 HO for transferring the context data from the first application service platform 110A to the second application service platform 110B.

In an initial stage of the processes of FIGS. 3A and 3B, neighbor discovery may be performed, as indicated by step 402. This may involve reporting by the UE 10 and typically also other UEs (not illustrated) to establish neighbor relations of the involved nodes. On the basis of such neighbor relations, the first eNB 110A and the second eNB 110B may decide to setup a connection via the X2 interface, e.g., to support handling of HOs between the first eNB 110A and the second eNB 110B. As illustrated, this may involve transmitting an X2 Setup Request 302 from the first eNB 110A to the second eNB 110B and transmitting an X2 Setup Response 303 from the second eNB 110B to the first eNB 110A.

As further illustrated, the application service(s) may then be provided by the first application platform 150A to the UE 10, which may involve transmitting user plane (UP) traffic 304 of the corresponding user session(s) between the first application service platform 150A and the RNL 112A of the first eNB 110A. Further, this may involve transmitting UP traffic 305 of the corresponding user session(s) between the RNL 112A of the first eNB 110A and the SGW 190. Still further, this may involve transmitting UP traffic 306 of the corresponding user session(s) between the RNL 112A of the first eNB 110A and the UE 10.

At some point, the UE 10 may perform a measurement on a reference signal 307 transmitted by the second eNB 110B, and the RNL 112A of the first eNB 110A may receive a corresponding measurement report 308 from the UE 10. The measurement report 308 may trigger a HO decision of the RNL 112A of the first eNB 110A, as indicated by step 309. In the illustrated example, it is assumed that the HO decision involves performing the HO of the UE 10 to the second eNB 110B.

In response to the HO decision, the RNL 112A may also request the context data (CTXT) from the MIH-U 114A of the first eNB 110A, as indicated by CTXT request 310. The CTXT request 310 may be transmitted in connection with other signaling for coordinating the HO with the migration of the user session(s) established between UE 10 and the first application service platform 150A, e.g., a request to initiate potential migration of the user session(s). The CTXT request 310 may for example be transmitted via the above-mentioned sixth interface IF6 between the RNL 112A and the MIH-U 114A of the first eNB 110A.

As indicated by step 311, interaction between the MIH-U 114A of the first eNB 110A and the first application service platform 150A may then be utilized to prepare the migration of the user session(s). This may for example involve halting the application(s) 160 with user session(s) to be migrated and compiling the context data, e.g., by interaction of the MIH-U 114A and the MIHF 155A of the first application service platform 150A via the above-mentioned fourth interface IF4. In the course of this process, the MIHF 155A of the first application service platform 150A may also interact with the application(s) 160 executed on the first application service platform 150A, e.g., via the above mentioned second interface IF2, the session mobility interface 152, and the above-mentioned first interface IF1. Further, also the TCP state of the sessions to be migrated may be determined, e.g., via the above-mentioned third interface IF3 and the session mobility interface 152. As a result, the requested context data may be compiled and provided to the RNL 112A of the first eNB 110A, as indicated by message 312. The context data may include a state of the executed application(s) 160 with user session(s) to be migrated. Further, the context data may include the TCP state associated with the user session(s) to be migrated. Until receiving the requested context data in message 312, the RNL 112A of the first eNB 110A suspends further processing of the HO.

Upon receiving the requested context data in message 312, the RNL 112A of the first eNB 110A proceeds with the processing of the HO. In particular, the RNL 112A proceeds by sending a Handover Request message 313 to the RNL 112B of the second eNB 110B. As illustrated, the Handover Request message 313 includes the context data to be transferred to the second application service platform 150B at the second eNB 110B. The Handover Request message may be an X2AP Handover Request message as defined in 3GPP TS 36.423. The context data may be included in an IE or sub-IE defined for this message type, e.g., an IE referred to as "RRC Context" or a sub-IE in an IE referred to as "E-RABs To Be Setup List", or an IE specifically defined for this purpose.

Upon receiving the Handover Request message 312, the RNL 112B of the second eNB 110B extracts the enclosed context data and provides the context data to the MIH-U 114B of the second eNB 110B, as indicated by message 314. This may be accomplished via the above-mentioned sixth interface IF6. By interaction of the MIH-U 114B of the second eNB 110B and the second application service platform 150B, the transfer of the context data is then finalized, as indicated by step 315. This may for example involve installing the context data in the second application service platform 150B, e.g., by configuring the application state or TCP state according to the received context data. For this purpose, interactions via the above-mentioned fourth interface IF4 between the MIH-U 114B of the second eNB 110B and the MIHF 155B of the second application service platform 150B, via the above mentioned second interface IF2, third interface IF3, and the session mobility interface 152 within the second application service platform 150B, and/or via the above-mentioned first interface IF1 between the second application service platform 150B and the application(s) executed thereon.

The second application service platform 150B may then provide a response (RSP) to the first application service platform 150A, e.g., to confirm successful installation of the transferred context. As illustrated by message 316, this may involve sending the response from the MIH-U 114B of the second eNB 110B to the RNL 112B of the second eNB 110B and including the response in a Handover Request Acknowledgement message 317 transmitted from the RNL 112B of the second eNB 110B to the RNL 112A of the first eNB 110A. The Handover Request Acknowledgement message may be an X2AP Handover Request Acknowledgement message as defined in 3GPP TS 36.423. The response from the second application service platform 150B may be included in an IE or sub-IE defined for this message type, e.g., an IE referred to as "Target eNB To Source eNB Transparent Container", an IE referred to as "E-RABs Admitted List", or an IE specifically defined for this purpose.

Upon receiving the Handover Request Acknowledgement message 317, the RNL 112A of the first eNB 110A extracts the enclosed response and provides the response to the MIH-U 114A of the first eNB 110A, as indicated by message 318, from where the corresponding information may be further distributed to the first application service platform 150A and its elements via the above-mentioned sixth interface IF6, fourth interface IF4, second interface IF2, session mobility interface 152, first interface IF1, or third interface IF3.

The HO may then be completed by the RNL 112A of the first eNB 110A sending a RRCConnectionReconfiguration message 319 to the UE 10, which then disconnects from the source cell served by the first eNB 110A and connects to the target cell served by the second eNB 110B, as indicated by step 320. As further illustrated, completion of the HO may involve transferring the status of first eNB 110A to the second eNB 110B, as indicated by message 321, forwarding of UP data from the RNL 112A of the first eNB 110A to the RNL 112B of the second eNB 110B, as indicated by message 322, and sending a RRConnectionReconfigurationComplete message 323 from the UE 10 to the RNL 112B of the second eNB 110B.

As illustrated by message 324 and step 325, until receipt of the RRCConnectionReconfiguration message 323 by the RNL 112B of the second eNB 110B, the RNL 112B of the second eNB 110B may buffer UP traffic from the second application service platform 150B to the UE 10. This buffering may help to seamlessly resume the migrated user session(s) even if the completion of the HO is delayed.

As further illustrated, after receipt of the RRCConnectionReconfiguration message 323 by the RNL 112B of the second eNB 110B, UP traffic related to the migrated user session(s) may be transmitted between the second application service platform 150B and the RNL 112B of the second eNB 110B, from the RNL 112B of the second eNB 110B to the SGW 190, and between the RNL 112B of the second eNB 110B and the UE 10. However, the SGW 190 would still send UP traffic to the RNL 112A of the first eNB 110A, as indicated by 328, 327, and 328. To terminate the forwarding of the UP traffic through the RNL 112A of the first eNB 110A, the RNL 112B of the second eNB 110B may send a Path Switch Request 329 to the MME 180. The MME 180 then sends a Modify Bearer Request 330 to the SGW 190, which sends a GTP-UP (GPRS Tunnelling Protocol— User Plane) End Marker to the RNL 112A of the first eNB 110A, which causes the RNL 112A of the first eNB 110A to terminate the forwarding. As illustrated, UP traffic related to the migrated user session(s) may then be transmitted between the second application service platform 150B and the RNL 112B of the second eNB 110B, between the RNL 112B of the second eNB 110B to the SGW 190, and between the RNL 112B of the second eNB 110B and the UE 10, as indicated by 332, 333, and 334. Reconfiguration of the UP traffic path may then be completed by the RNL 112A of the first eNB 110A sending a GTP-UP End Marker 335 via the SGW 190 to the RNL 112B of the second eNB 110B, the MME 180 sending a Path Switch Request Acknowledgement 337 to the RNL 112B of the second eNB 110B, and the RNL 112B of the second eNB 110B sending a UE Context Release message 338 to the RNL 112A of the first eNB 110B.

Further details of the HO process may correspond to the X2 HO process as specified in 3GPP TS 36.300.

At the end of the processes of FIGS. 3A and 3B, the user session(s) of the application service(s) have thus been migrated from the first application service platform 150A to the second application service platform 150B, and providing the application service(s) to the UE 10 is accomplished by the second application service platform 150B.

Figure 4B:
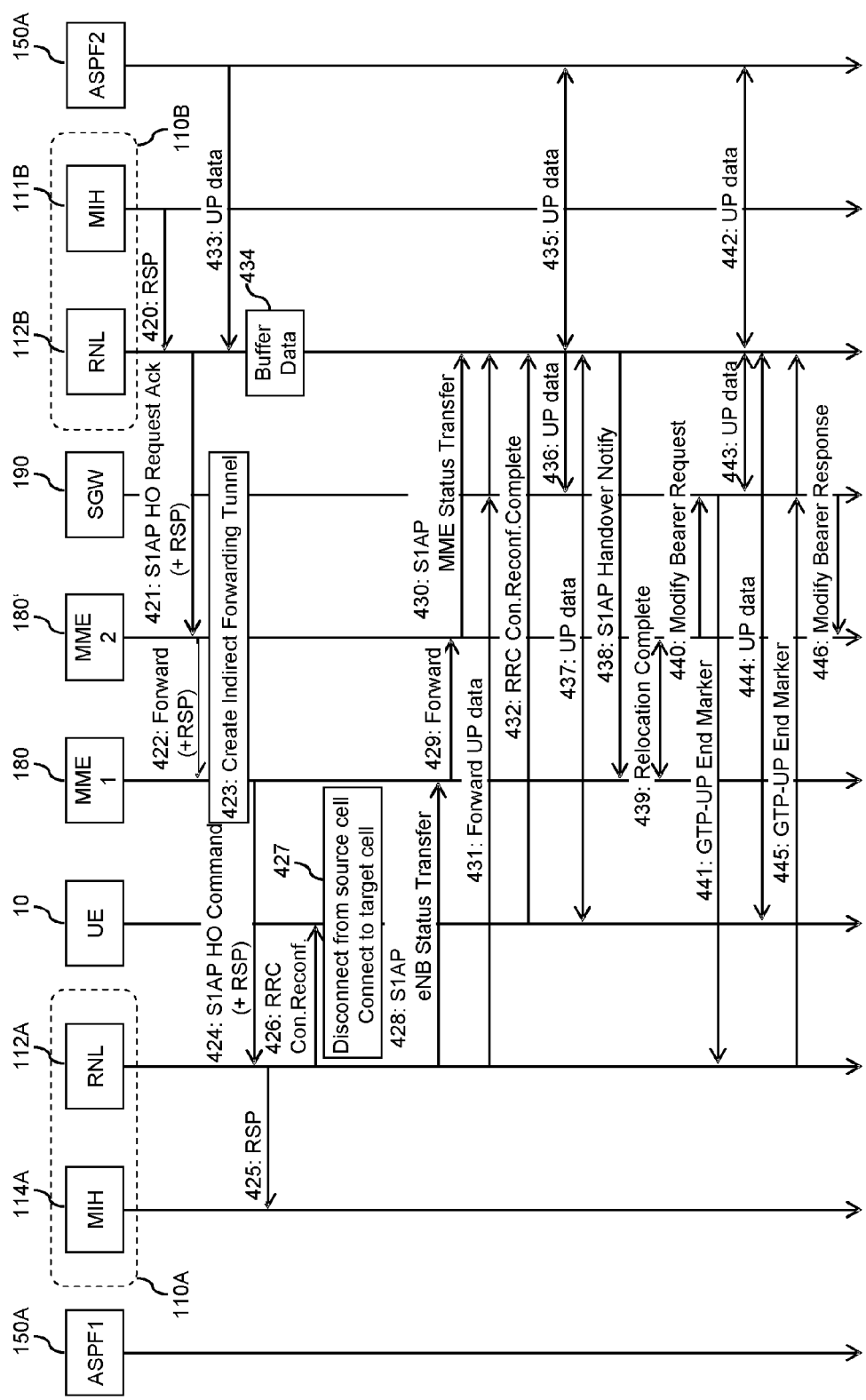

FIGS. 4A and 4B show a signaling flow of a process applied when utilizing a HO message of an S1 HO for transferring the context data from the first application service platform 110A to the second application service platform 110B. In the example of FIGS. 4A and 4B the S1 HO is assumed to also involve MME relocation, i.e., a change in responsibility for the UE 10 from a first MME (in the illustrated example the MME 180) to a second MME (in the illustrated example MME 180').

In an initial stage of the processes of FIGS. 4A and 4B, neighbor discovery may be performed, as indicated by step 401. This may involve reporting by the UE 10 and typically also other UEs (not illustrated) to establish neighbor relations of the involved nodes. On the basis of such neighbor relations, the first eNB 110A and the second eNB 110B may decide setup a connection via the X2 interface, e.g., to support handling of HOs between the first eNB 110A and the second eNB 110B. As illustrated, this may involve transmitting an X2 Setup Request 402 from the first eNB 110A to the second eNB 110B. As indicated by step 403, upon receiving the X2 Setup Request 402 from the first eNB 110A the second eNB 110B may decide to use the S1 HO procedure for HOs between the first eNB 110A and the second eNB 110B, e.g., because the first eNB 110A and the second eNB 110B are assigned to different MME pools. In the example of FIGS. 4A and 4B, the first MME 180 may be an MME from a first pool to which the first eNB 110A is assigned, and the second MME 180' may be an MME from a second pool to which the second eNB 110A is assigned. The second eNB 110B may then transmit an X2 Setup Response 404 from the second eNB 110B to the first eNB 110A. Upon receiving the X2 Setup Request 402 from the first eNB 110A the second eNB 110B may decide to use the S1 HO procedure for HOs between the first eNB 110A and the second eNB 110B, as indicated by step 405.

As further illustrated, the application service(s) may then be provided by the first application platform 150A to the UE 10, which may involve transmitting user plane (UP) traffic 406 of the corresponding user session(s) between the first application service platform 150A and the RNL 112A of the first eNB 110A. Further, this may involve transmitting UP traffic 407 of the corresponding user session(s) between the RNL 112A of the first eNB 110A and the SGW 190. Still further, this may involve transmitting UP traffic 408 of the corresponding user session(s) between the RNL 112A of the first eNB 110A and the UE 10.

At some point, the UE 10 may perform a measurement on a reference signal 409 transmitted by the second eNB 110B, and the RNL 112A of the first eNB 110A may receive a corresponding measurement report 410 from the UE 10. The measurement report 410 may trigger a HO decision of the RNL 112A of the first eNB 110A, as indicated by step 411. In the illustrated example, it is assumed that the HO decision involves performing the HO of the UE 10 to the second eNB 110B.

In response to the HO decision, the RNL 112A may also request the context data (CTXT) from the MIH-U 114A of the first eNB 110A, as indicated by CTXT request 412. The CTXT request 412 may be transmitted in connection with other signaling for coordinating the HO with the migration of the user session(s) established between UE 10 and the first application service platform 150A, e.g., a request to initiate potential migration of the user session(s). The CTXT request 412 may for example be transmitted via the above-mentioned sixth interface IF6 between the RNL 112A and the MIH-U 114A of the first eNB 110A.

As indicated by step 413, interaction between the MIH-U 114A of the first eNB 110A and the first application service platform 150A may then be utilized to prepare the migration of the user session(s). This may for example involve halting the application(s) 160 with user session(s) to be migrated and compiling the context data, e.g., by interaction of the MIH-U 114A and the MIHF 155A of the first application service platform 150A via the above-mentioned fourth interface IF4. In the course of this process, the MIHF 155A of the first application service platform 150A may also interact with the application(s) 160 executed on the first application service platform 150A, e.g., via the above mentioned second interface IF2, the session mobility interface 152, and the above-mentioned first interface IF1. Further, also the TCP state of the sessions to be migrated may be determined, e.g., via the above-mentioned third interface IF3 and the session mobility interface 152. As a result, the requested context data may be compiled and provided to the RNL 112A of the first eNB 110A, as indicated by message 414. The context data may include a state of the executed application(s) 160 with user session(s) to be migrated. Further, the context data may include the TCP state associated with the user session(s) to be migrated. Until receiving the requested context data in message 414, the RNL 112A of the first eNB 110A suspends further processing of the HO.

Upon receiving the requested context data in message 414, the RNL 112A of the first eNB 110A proceeds with the processing of the HO. In particular, the RNL 112A proceeds by sending a Handover Required message 415 to the first MME 180. As illustrated, the Handover Required message 415 includes the context data to be transferred to the second application service platform 150B at the second eNB 110B. The Handover Required message 415 may be an S1AP Handover Required message as defined in 3GPP TS 36.413. The context data may be included in an IE or sub-IE defined for this message type, e.g., an IE referred to as "Source to Target Transparent Container", or an IE specifically defined for this purpose.

As further illustrated, the first MME 180 may then forward the Handover Required message 415 to the second MME 180', as indicated by message 416. Message 416 may be a Forward Relocation Request GTPv2-C message transmitted via an interface between the MMEs 180, 180', e.g., an S10 interface as specified in 3GPP TS 23.401 V12.6.0 (2014 September). As indicated, also message 416 includes the context information to be transferred to the second application service platform 150B.

The second MME 180' then sends a Handover Request message 417 to the RNL 112B of the second eNB 110B. The Handover Request message 417 may be an S1AP Handover Request message as defined in 3GPP TS 36.413. The context data may be included in an IE or sub-IE defined for this message type, e.g., an IE referred to as "Source to Target Transparent Container", or an IE specifically defined for this purpose.

Upon receiving the Handover Request message 417, the RNL 112B of the second eNB 110B extracts the enclosed context data and provides the context data to the MIH-U 114B of the second eNB 110B, as indicated by message 418. This may be accomplished via the above-mentioned sixth interface IF6. By interaction of the MIH-U 114B of the second eNB 110B and the second application service platform 150B, the transfer of the context data is then finalized, as indicated by step 420. This may for example involve installing the context data in the second application service platform 150B, e.g., by configuring the application state or TCP state according to the received context data. For this purpose, interactions via the above-mentioned fourth interface IF4 between the MIH-U 114B of the second eNB 110B and the MIHF 155B of the second application service platform 150B, via the above mentioned second interface IF2, third interface IF3, and the session mobility interface 152 within the second application service platform 150B, and/or via the above-mentioned first interface IF1 between the second application service platform 150B and the application(s) executed thereon.

The second application service platform 150B may then provide a response (RSP) to the first application service platform 150A, e.g., to confirm successful installation of the transferred context. As illustrated by message 420, this may involve sending the response from the MIH-U 114B of the second eNB 110B to the RNL 112B of the second eNB 110B and including the response in a Handover Request Acknowledgement message 421 transmitted from the RNL 112B of the second eNB 110B to the second MME 180'. The Handover Request Acknowledgement message 421 may be an S1AP Handover Request Acknowledgement message as defined in 3GPP TS 36.423. The response from the second application service platform 150B may be included in an IE or sub-IE defined for this message type, e.g., an IE referred to as "Target To Source Transparent Container", or an IE specifically defined for this purpose.

As further illustrated, the second MME 180' may then forward the Handover Request Acknowledgement message 421 to the first MME 180, as indicated by message 422. Message 422 may be a Forward Relocation Request Response GTPv2-C message, e.g., transmitted via the S10 interface between the MMEs 180, 180'. As indicated, also message 422 includes the response to first application service platform 150A. As further indicated by step 423, at this point the first MME 180 and the SGW 190 may also establish an indirect data forwarding tunnel for forwarding of UP traffic from the RNL 112A of the first eNB 110A via the SGW 190 to the RNL 112B of the second eNB 110B.

The first MME 180 then sends a Handover Command message 424 to the RNL 112A of the first eNB 110A. The Handover Command message 424 may be an S1AP Handover Command message as defined in 3GPP TS 36.423. The response from the second application service platform 150B may be included in an IE or sub-IE defined for this message type, e.g., an IE referred to as "Target To Source Transparent Container", or an IE specifically defined for this purpose.

Upon receiving the Handover Command message 423, the RNL 112A of the first eNB 110A extracts the enclosed response and provides the response to the MIH-U 114A of the first eNB 110A, as indicated by message 425, from where the corresponding information may be further distributed to the first application service platform 150A and its elements via the above-mentioned sixth interface IF6, fourth interface IF4, second interface IF2, session mobility interface 152, first interface IF1, or third interface IF3.

The HO may then be completed by the RNL 112A of the first eNB 110A sending a RRCConnectionReconfiguration message 426 to the UE 10, which then disconnects from the source cell served by the first eNB 110A and connects to the target cell served by the second eNB 110B, as indicated by step 427. As further illustrated, completion of the HO may involve transferring the status of the first eNB 110A to second eNB 110B, and transferring the status of the first MME 180 to the second MME 180', as indicated by message 428, 429, and 430, forwarding of UP data from the RNL 112A of the first eNB 110A to the RNL 112B of the second eNB 110B, as indicated by message 431, and sending a RRConnectionReconfigurationComplete message 432 from the UE 10 to the RNL 112B of the second eNB 110B.

As illustrated by message 433 and step 434, until receipt of the RRCConnectionReconfiguration message 432 by the RNL 112B of the second eNB 110B, the RNL 112B of the second eNB 110B may buffer UP traffic from the second application service platform 150B to the UE 10. This buffering may help to seamlessly resume the migrated user session(s) even if the completion of the HO is delayed.

As further illustrated, after receipt of the RRCConnectionReconfiguration message 432 by the RNL 112B of the second eNB 110B, UP traffic related to the migrated user session(s) may be transmitted between the second application service platform 150B and the RNL 112B of the second eNB 110B, from the RNL 112B of the second eNB 110B to the SGW 190, and between the RNL 112B of the second eNB 110B and the UE 10. However, the SGW 190 would still send UP traffic to the RNL 112A of the first eNB 110A, as indicated by 435, 436, and 437. To terminate the forwarding of the UP traffic through the RNL 112A of the first eNB 110A, the RNL 112B of the second eNB 110B may send a Handover Notify message 438 to the first MME 180. The first MME 180 and the second MME 180' may then confirm to each other that the relocation of the UE 10 is complete, as indicated by 439, and the first MME 180 may send a Modify Bearer Request 440 to the SGW 190, which sends a GTP-UP (GPRS Tunnelling Protocol—User Plane) End Marker to the RNL 112A of the first eNB 110A, which causes the RNL 112A of the first eNB 110A to terminate the forwarding. As illustrated, UP traffic related to the migrated user session(s) may then transmitted between the second application service platform 150B and the RNL 112B of the second eNB 110B, between the RNL 112B of the second eNB 110B to the SGW 190, and between the RNL 112B of the second eNB 110B and the UE 10, as indicated by 442, 443, and 444. Reconfiguration of the UP traffic path may then be completed by the RNL 112A of the first eNB 110A sending a GTP-UP End Marker 445 via the SGW 190 to the RNL 112B of the second eNB 110B, and the SGW 190 sending a Modify Bearer Response 446 to the second MME 180'. Further, processes for deleting the UE context at the RNL 110A of first eNB 110A and for deleting the established indirect data forwarding tunnel may be performed (not illustrated).

Further details of the HO process may correspond to the S1 HO process as specified in 3GPP TS 36.300.

At the end of the processes of FIGS. 4A and 4B, the user session(s) of the application service(s) have thus been migrated from the first application service platform 150A to the second application service platform 150B, and providing the application service(s) to the UE 10 is accomplished by the second application service platform 150B.

As can be seen from the exemplary processes of FIGS. 3A, 3B, 4A, and 4B, the transferring of the context data in the HO message(s) may cause an additional delay for the HO process, i.e., may delay completion of the HO as compared to a situation in which the context data are not transferred in the HO message(s). This delay may for example include a contribution of a delay due to suspending the processing of the HO until the required context data are compiled and available at the RNL 112A of the first eNB 110A, e.g., a delay between taking the HO decision at step 309 and sending the Handover Request message 313, or a delay between taking the HO decision at step 411 and sending the Handover Required message 415. Further, sending of the HO message(s) itself may take longer due to an increased data volume of the HO messages(s). In the illustrated concepts, this may be taken into account by selectively and adaptively utilizing the option of transferring the context data in the HO message(s), taking into account the expected delay.

In some scenarios, if the expected delay is too large, the context data may be transferred to the second application platform 150B in X2AP or S1AP message(s) which are not utilized for controlling the HO, e.g., other messages than the X2AP Handover Request message, the S1AP Handover Required message, or the S1AP Handover Request message. For example a specific X2AP message, S1AP message, or GTPv2-C message could be defined for this purpose. Alternatively, existing messages could be reused for this purpose, e.g., by defining a corresponding IE for such messages. of the A new X2AP message would probably be the most appropriate to fulfill this purpose, but it would also be possible to reuse an existing X2AP message, e.g. the X2AP Message Transfer message.

As a further option, in response to the expected delay being too large, the context data may be transferred in messages not based on the X2AP, S1AP, or GTPv2-C protocols, e.g., utilizing SCTP (Stream Control Transmission Protocol), TCP, or UDP (User Datagam Protocol). Such protocols could be utilized on the X2 interface or S1 interface, or separate interface could be defined for this purpose.

In some cases, the above options of utilizing other X2AP, S1AP, or GTPv2-C messages, or other protocols may also be utilized in addition to the option of transferring the context data in the HO message(s), thereby reducing the data volume of the HO message(s) and the associated delay.

As a further option, in response to the expected delay being too large, one or more parameter(s) for triggering the HO may be adjusted. For instance, the threshold for the HO (e.g. in terms of received radio signal strength, such as Reference Signal Received Power (RSRP)) may be lowered in order to trigger the HO at an earlier time, thereby providing more time to execute the HO even when transferring the context data in the HO message(s). Another example of adjusting such parameter is reducing a Time To Trigger (TTT) (i.e., the time from a detected measurement threshold crossing until a report to the source eNB 110A is triggered), so that the HO may be initiated at an earlier time. By increasing the time available for completing the HO, a maximum time available for migration of the user session(s) may be increased. This may in turn enable transfer of context data with larger data volume in the HO message(s).

Further, the expected delay may also be considered at the target side. For example, when the HO is completed before finalizing migration of the user session(s), there is a risk that the UE 10 starts to send UP traffic towards the application platform at the target eNB 110B before the second application service platform 150B is ready to receive such UP traffic. One way to address this is to use a protocol with retransmission functionalities, such as TCP, for the UP traffic, which means that the UP traffic received too early would be resent. Further, this may be addressed by buffering the concerned packets at the target eNB 110B until the migration of the user session(s) is finalized, e.g., as indicated by steps 325 and 434.

When utilizing the option of buffering UP traffic of user sessions of which migration is not yet finalized, the HO message(s) may be used to indicate to the target eNB 110B that buffering is required and/or which UP traffic should be buffered. In this way, the resource requirements for the buffering may be limited. The buffering may be stopped when finalization of the migration is indicated to the target eNB 110B, e.g., as explained in connection with the above-mentioned responses in messages 316 and 420.

Figure 5:
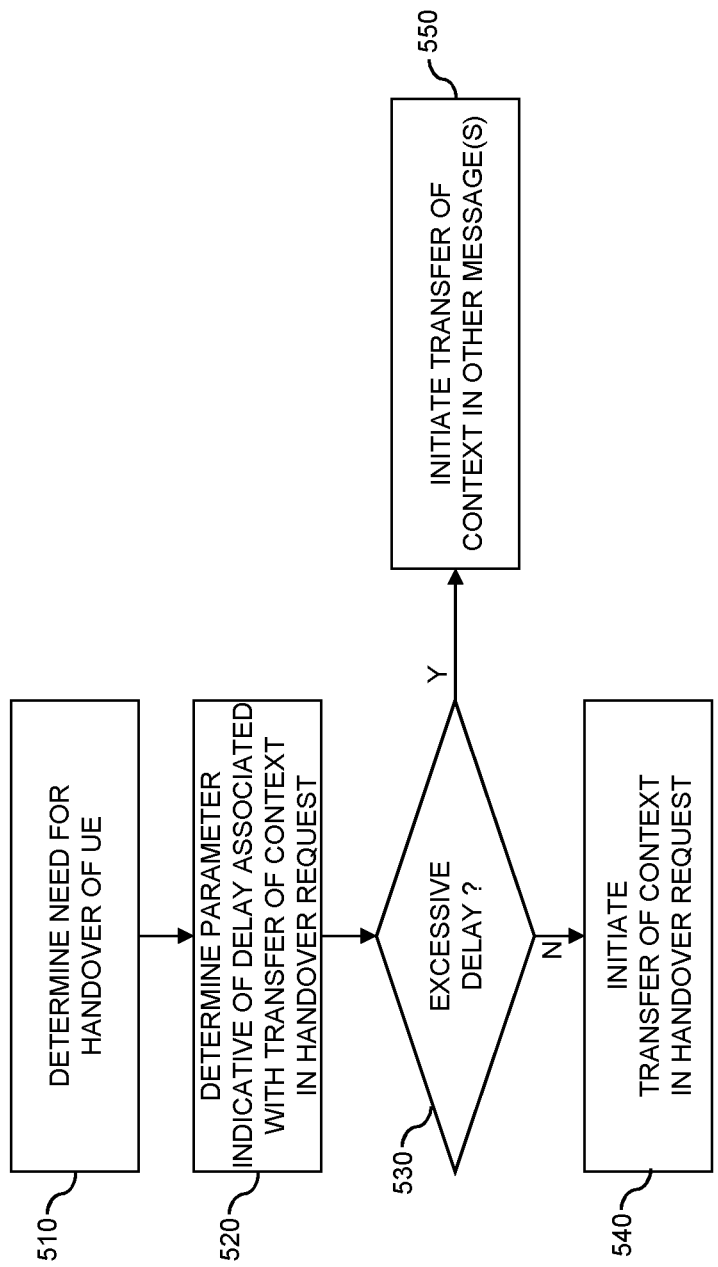
FIG. 5 shows a flowchart for illustrating a method according to an embodiment of the invention.

FIG. 5 shows a flowchart for illustrating a method which may be utilized for implementing the illustrated concepts. The method may be applied for providing at least one application service to a UE, e.g., the UE 10, via an application service platform at an access node of a cellular network, e.g., the first application service platform 150A, and a further application service platform at a further access node of the cellular network, e.g., the second application service platform 150B. The access nodes may for example correspond to base stations of the cellular network, such as the above-mentioned eNBs 110, 110A, 110B. However, the method may also be applied with respect to other kinds of access nodes, e.g., hub nodes in a RAN of the cellular network. The application service platforms and/or further application service platform may be co-located with the respective access node. In some scenarios, the application service platform and/or the further application service platform may also be integrated with the respective access node in the same network node.

At step 510, a need for a HO of the UE from the access node to the further access node may be detected. This may for example involve evaluating one or more measurement reports and taking a HO decision on the basis of such measurement reports, e.g., as explained in connection with step 309 of FIG. 3A or step 411 of FIG. 4A.

At step 520, a parameter indicative of a delay associated with transfer of context data from the application service platform to the further application service platform in one or more HO messages for controlling the HO is determined. Examples of such HO messages are the above-mentioned Handover Request message 313, the above-mentioned Handover Required Message 415, the forwarding message 416, or the Handover Request message 417. The context data are associated with at least one user session of the at least one application service provided to the UE. For example, the context data may include information on a state of an application with respect to the user session and/or a TCP state of the user session.

The determination of the parameter at step 520 may involve estimating the delay. However, also a parameter otherwise representative of the delay may be determined, e.g., a data volume of the context data to be transferred.

The delay may include a delay associated with transferring the context data in the HO message(s) from the access node to the further access node, e.g., in the form a travel time of the HO message(s).

Further, the delay may include a delay associated with transferring the context data from the application service platform to the access node, e.g., a delay associated with sending a message with the context data from the application service platform to the access node, e.g., via the sixth interface IF6 as illustrated in FIG. 1. The latter delay may also include a contribution associated with requesting the context data by the access node, e.g., as explained in connection with messages 310 or 412 and/or with compiling the context data. For example, the delay associated with transferring the context data from the application service platform to the access node could be measured from requesting the context data by the access node (corresponding to message 310 or 412) to receiving the context at the access node (corresponding to message 312 or 414). This delay contribution may also be measured during the process of transferring the context data. For example, the access node could measure the time between requesting the context data from the application service platform and receiving the requested context data.

The determination of the parameter may involve estimating the delay on the basis of a data volume of the context data. For example, if the context data are compiled and the data volume of the context data is known, the delay may be estimated considering the available data transmission rate for sending the HO message(s). Further, typical data volumes of the context data for certain applications may be preconfigured or learned and be utilized in the estimation.

Further, the determination of the parameter may also involve estimating the delay on the basis of the at least one application service provided to the UE. For example, depending on the application service, the data volume of the context data and/or the time required for compiling the context data may vary. Here, a category of the application service, such as multimedia streaming or text based messaging, or even on the specific application service, such as identified by name, provider, version number of application, may be considered.

The determination of the parameter may also involve estimating the delay on the basis of subscription data associated with the UE. For example, such subscription data may contain information associated with the typically utilized application services and delays experienced when transferring context data in HO messages, and the delay for a future HO may be estimated on the basis of such information. Accordingly, the delay may also be estimated the on the basis of delays experienced in earlier processes of transferring context data in a HO message. As mentioned above, such historic data experienced in earlier processes of transferring context data in a HO message may be collected in subscription data associated with the UE. However, also other ways of collecting the historic data may be utilized, e.g., on a network level or on an application service level.

Depending on the determined parameter migration of the at least one user session from the application service platform to the further application service platform is controlled.

In the method of FIG. 5, the control of the migration involves determining at step 530 whether the delay is excessive. This is accomplished depending on the parameter determined at step 520, e.g., by comparing the parameter or the delay estimated from the parameter to a first threshold and/or to a second threshold. For example, if the parameter or delay is above a first threshold, the delay may be determined to be excessive. Similarly, the parameter or delay is below a second threshold, the delay may be determined to be not excessive. The first and second thresholds may be different. In particular, the first threshold may be higher than the second threshold. In such cases, also a behavior may be defined which is applied when the parameter or delay is the range from the first threshold to the second threshold. Such behavior may for example involve adapting one or more parameters for triggering the HO, e.g., as explained in connection with FIG. 6 and/or controlling buffering of traffic related to the user session(s), e.g., as explained in connection with FIG. 7.

If the delay is not excessive, the method proceeds to step 540, as indicated by branch "N". At step 540, transfer of the context data in the HO message(s) is initiated, e.g., as explained in connection with HO messages 313, 415, 416, and 417.

If the delay is excessive, the method proceeds to step 550, as indicated by branch "Y". At step 550, transfer of the context data in the HO message(s) in on or more other message(s) than the HO message(s) is initiated. This may be accomplished in addition or as alternative to transferring the context data in the HO message. Such other messages may be based on the same protocol as the HO messages, e.g., on the X2AP, S1AP, or GTPv2-C. However, also a different protocol may be utilized for sending the other messages, e.g., TCP, SCTP, or UDP. Moreover, the other messages may be sent over the same interface(s) as the HO message(s), e.g., the X2 or S1 interface, or one or more other interfaces may be used for this purpose, e.g., a generic IP based network interface.

In some scenarios, the decision of step 530 may also be taken during the ongoing process of transferring the context data. For example, the access node may have requested the context data from the application service platform and then find an excessive delay associated with the transferring of the context data from the application service platform to the access node. In other cases, the decision of step 530 may also be taken at an earlier stage, e.g., with respect to each individual HO when detecting the need for the HO. Further, the decision may also be taken before detecting the need for the HO, e.g., on the level of the application service(s), the UE, or a subscription associated with the UE.

In the method of FIG. 5, the determination of the parameter at step 520 and the control steps of steps 530, 540, and 550 may be performed by the access node, i.e., at the source side of the HO. If a processor based implementation of the such access node is used, the steps of the method may be performed by one or more processors of the access node. For this purpose, the processor(s) may execute correspondingly configured program code. Further, at least some of the corresponding functionalities may be hardwired in the processor(s).

Figure 6:
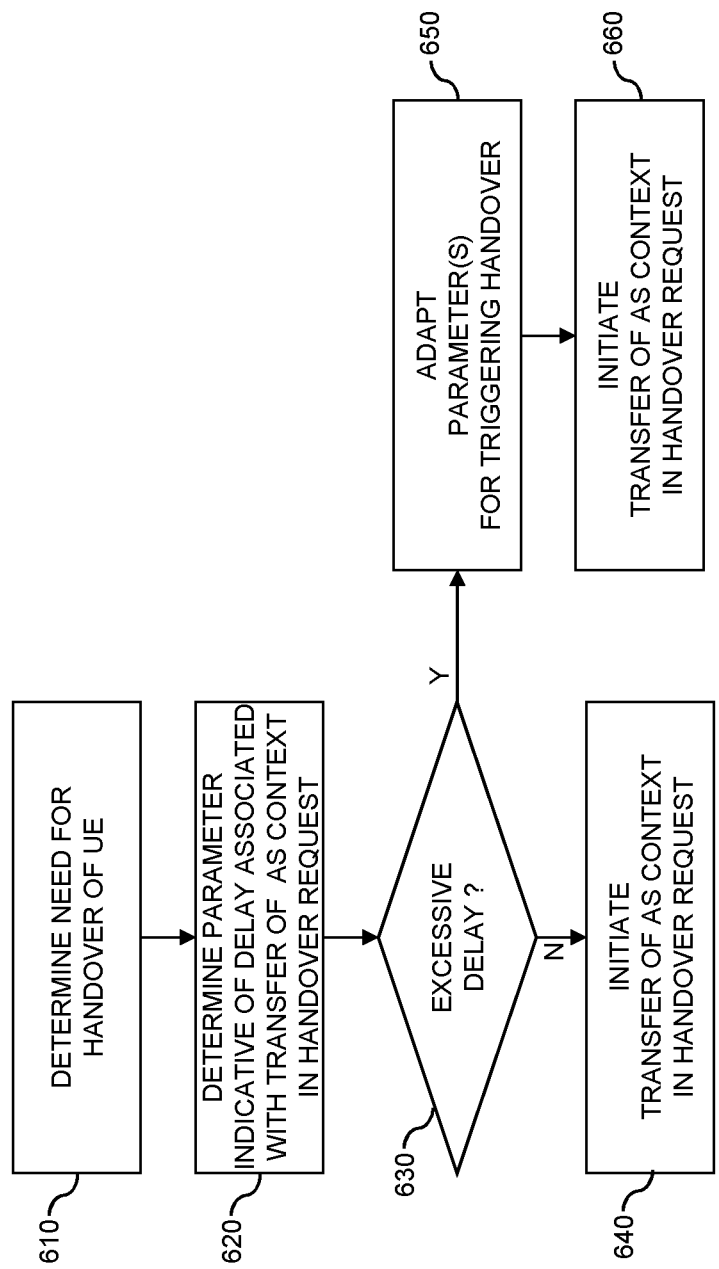
FIG. 6 shows a flowchart for illustrating a further method according to an embodiment of the invention.

FIG. 6 shows a flowchart for illustrating a further method which may be utilized for implementing the illustrated concepts. The method may be applied for providing at least one application service to a UE, e.g., the UE 10, via an application service platform at an access node of a cellular network, e.g., the first application service platform 150A, and a further application service platform at a further access node of the cellular network, e.g., the second application service platform 150B. The access nodes may for example correspond to base stations of the cellular network, such as the above-mentioned eNBs 110, 110A, 110B. However, the method may also be applied with respect to other kinds of access nodes, e.g., hub nodes in a RAN of the cellular network. The application service platforms and/or further application service platform may be co-located with the respective access node. In some scenarios, the application service platform and/or the further application service platform may also be integrated with the respective access node in the same network node.

At step 610, a need for a HO of the UE from the access node to the further access node may be detected. This may for example involve evaluating one or more measurement reports and taking a HO decision on the basis of such measurement reports, e.g., as explained in connection with step 309 of FIG. 3A or step 411 of FIG. 4A.

At step 620, a parameter indicative of a delay associated with transfer of context data from the application service platform to the further application service platform in one or more HO messages for controlling the HO is determined. Examples of such HO messages are the above-mentioned Handover Request message 313, the above-mentioned Handover Required Message 415, the forwarding message 416, or the Handover Request message 417. The context data are associated with at least one user session of the at least one application service provided to the UE. For example, the context data may include information on a state of an application with respect to the user session and/or a TCP state of the user session.

The determination of the parameter at step 620 may involve estimating the delay. However, also a parameter otherwise representative of the delay may be determined, e.g., a data volume of the context data to be transferred.

The delay may include a delay associated with transferring the context data in the HO message(s) from the access node to the further access node, e.g., in the form a travel time of the HO message(s).

Further, the delay may include a delay associated with transferring the context data from the application service platform to the access node, e.g., a delay associated with sending a message with the context data from the application service platform to the access node, e.g., via the sixth interface IF6 as illustrated in FIG. 1. The latter delay may also include a contribution associated with requesting the context data by the access node, e.g., as explained in connection with messages 310 or 412 and/or with compiling the context data. For example, the delay associated with transferring the context data from the application service platform to the access node could be measured from requesting the context data by the access node (corresponding to message 310 or 412) to receiving the context at the access node (corresponding to message 312 or 414). This delay contribution may also be measured during the process of transferring the context data. For example, the access node could measure the time between requesting the context data from the application service platform and receiving the requested context data.

The determination of the parameter may involve estimating the delay on the basis of a data volume of the context data. For example, if the context data are compiled and the data volume of the context data is known, the delay may be estimated considering the available data transmission rate for sending the HO message(s). Further, typical data volumes of the context data for certain applications may be preconfigured or learned and be utilized in the estimation.

Further, the determination of the parameter may also involve estimating the delay on the basis of the at least one application service provided to the UE. For example, depending on the application service, the data volume of the context data and/or the time required for compiling the context data may vary. Here, a category of the application service, such as multimedia streaming or text based messaging, or even on the specific application service, such as indentified by name, provider, version number of application, may be considered.

The determination of the parameter may also involve estimating the delay on the basis of subscription data associated with the UE. For example, such subscription data may contain information associated with the typically utilized application services and delays experienced when transferring context data in HO messages, and the delay for a future HO may be estimated on the basis of such information. Accordingly, the delay may also be estimated the on the basis of delays experienced in earlier processes of transferring context data in a HO message. As mentioned above, such historic data experienced in earlier processes of transferring context data in a HO message may be collected in subscription data associated with the UE. However, also other ways of collecting the historic data may be utilized, e.g., on a network level or on an application service level.

Depending on the determined parameter migration of the at least one user session from the application service platform to the further application service platform is controlled.

In the method of FIG. 6, the control of the migration involves determining at step 630 whether the delay is excessive. This is accomplished depending on the parameter determined at step 620, e.g., by comparing the parameter or the delay estimated from the parameter to a third threshold. For example, if the parameter or delay is above the third threshold, the delay may be determined to be excessive. Similarly, the parameter or delay is below the third threshold, the delay may be determined to be not excessive. When combining the method of FIG. 6 with the method of FIG. 5, the third threshold may for example be the same as the above-mentioned first threshold and lower than the above-mentioned second threshold. In the method of FIG. 6, the decision of step 630 is typically taken before detecting the need for the HO, e.g., on the level of the application service(s), the UE, or a subscription associated with the UE.

If the delay is not excessive, the method proceeds to step 640, as indicated by branch "N". At step 640, transfer of the context data in the HO message(s) is initiated, e.g., as explained in connection with HO messages 313, 415, 416, and 417.

If the delay is excessive, the method proceeds to step 650, as indicated by branch "Y". At step 650, one or more parameters for triggering the HO are adapted. This may for example involve adjusting one or more thresholds for triggering the HO. Such threshold may for example be defined in terms of received radio signal strength, such as RSRP. Lowering such threshold may allow triggering the HO at an earlier time, thereby providing more time to execute the HO even when transferring the context data in the HO message(s). The adaptation of step 650 may also involve reducing a TTT defining a time from detecting that a measured value relevant for triggering the HO crosses a measurement threshold until a report of the measurement is triggered. Again, triggering of the HO at an earlier time may be achieved.

At step 650, after triggering the HO based on the adapted parameter(s), transfer of the context data in the HO message(s) is initiated, e.g., as explained in connection with HO messages 313, 415, 416, and 417.

In the method of FIG. 6, the determination of the parameter at step 620 and the control steps of steps 630, 640, and 650 may be performed by the access node, i.e., at the source side of the HO.

Figure 7:
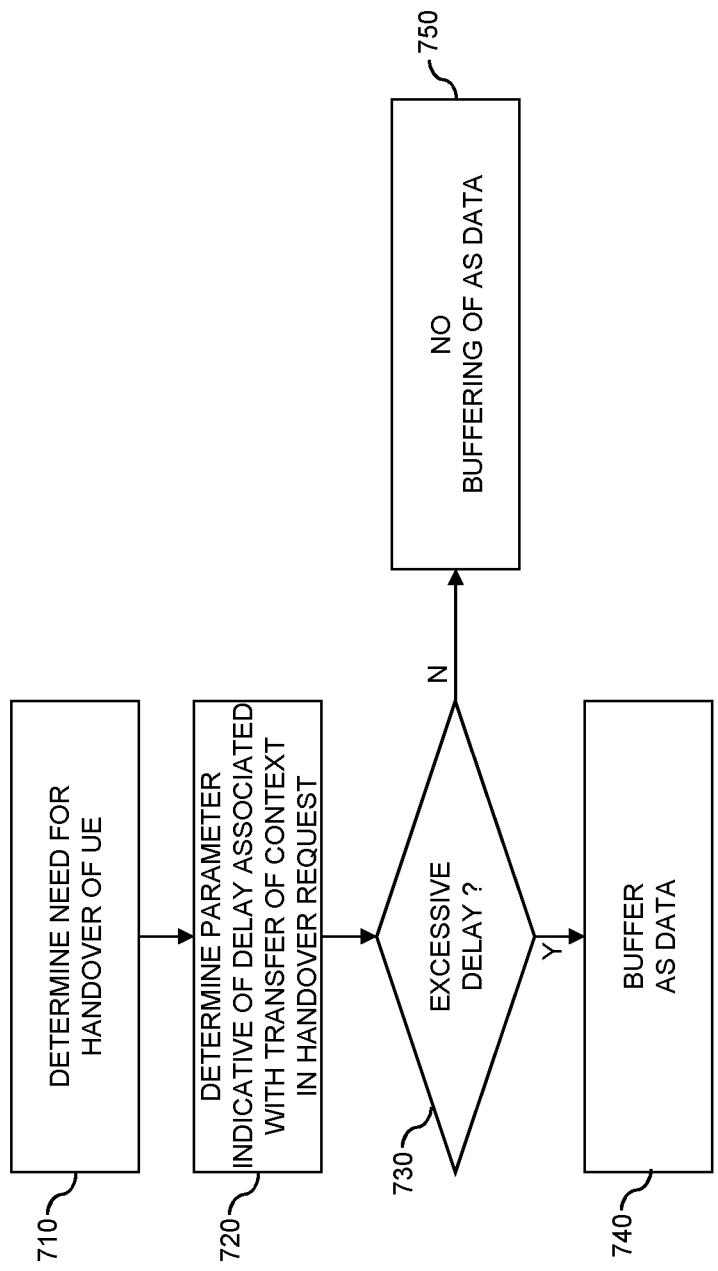
FIG. 7 shows a flowchart for illustrating a further method according to an embodiment of the invention.

FIG. 7 shows a flowchart for illustrating a method which may be utilized for implementing the illustrated concepts. The method may be applied for providing at least one application service to a UE, e.g., the UE 10, via an application service platform at an access node of a cellular network, e.g., the first application service platform 150A, and a further application service platform at a further access node of the cellular network, e.g., the second application service platform 150B. The access nodes may for example correspond to base stations of the cellular network, such as the above-mentioned eNBs 110, 110A, 110B. However, the method may also be applied with respect to other kinds of access nodes, e.g., hub nodes in a RAN of the cellular network. The application service platforms and/or further application service platform may be co-located with the respective access node. In some scenarios, the application service platform and/or the further application service platform may also be integrated with the respective access node in the same network node.

At step 710, a need for a potential HO of the UE from the access node to the further access node may be detected. This may for example occur when establishing neighbor relations between the access node and the further access, e.g., as explained in connection with step 301 of FIG. 3A or 401 of FIG. 4A.

At step 720, a parameter indicative of a delay associated with transfer of context data from the application service platform to the further application service platform in one or more HO messages for controlling the HO is determined. Examples of such HO messages are the above-mentioned Handover Request message 313, the above-mentioned Handover Required Message 415, the forwarding message 416, or the Handover Request message 417. The context data are associated with at least one user session of the at least one application service provided to the UE. For example, the context data may include information on a state of an application with respect to the user session and/or a TCP state of the user session.

The determination of the parameter at step 720 may involve estimating the delay. However, also a parameter otherwise representative of the delay may be determined, e.g., a data volume of the context data to be transferred.

The delay may include a delay associated with transferring the context data in the HO message(s) from the access node to the further access node, e.g., in the form a travel time of the HO message(s).

Further, the delay may include a delay associated with transferring the context data from the application service platform to the access node, e.g., a delay associated with sending a message with the context data from the application service platform to the access node, e.g., via the sixth interface IF6 as illustrated in FIG. 1. The latter delay may also include a contribution associated with requesting the context data by the access node, e.g., as explained in connection with messages 310 or 412 and/or with compiling the context data. For example, the delay associated with transferring the context data from the application service platform to the access node could be measured from requesting the context data by the access node (corresponding to message 310 or 412) to receiving the context at the access node (corresponding to message 312 or 414). This delay contribution may also be measured during the process of transferring the context data. For example, the access node could measure the time between requesting the context data from the application service platform and receiving the requested context data.

The determination of the parameter may involve estimating the delay on the basis of a data volume of the context data. For example, typical data volumes of the context data for certain applications may be preconfigured or learned and be utilized in the estimation.

Further, the determination of the parameter may also involve estimating the delay on the basis of the at least one application service provided to the UE. For example, depending on the application service, the data volume of the context data and/or the time required for compiling the context data may vary. Here, a category of the application service, such as multimedia streaming or text based messaging, or even on the specific application service, such as identified by name, provider, version number of application, may be considered.

The determination of the parameter may also involve estimating the delay on the basis of subscription data associated with the UE. For example, such subscription data may contain information associated with the typically utilized application services and delays experienced when transferring context data in HO messages, and the delay for a future HO may be estimated on the basis of such information. Accordingly, the delay may also be estimated the on the basis of delays experienced in earlier processes of transferring context data in a HO message. As mentioned above, such historic data experienced in earlier processes of transferring context data in a HO message may be collected in subscription data associated with the UE. However, also other ways of collecting the historic data may be utilized, e.g., on a network level or on an application service level.

Depending on the determined parameter migration of the at least one user session from the application service platform to the further application service platform is controlled.

In the method of FIG. 7, the control of the migration involves determining at step 730 whether the delay is excessive. This is accomplished depending on the parameter determined at step 720, e.g., by comparing the parameter or the delay estimated from the parameter to a fourth threshold. For example, if the parameter or delay is above the fourth threshold, the delay may be determined to be excessive. Similarly, the parameter or delay is below the fourth threshold, the delay may be determined to be not excessive. When combining the method of FIG. 7 with the method of FIG. 5, the fourth threshold may for example be the same as the above-mentioned first threshold and lower than the above-mentioned second threshold.

If the delay is excessive, the method proceeds to step 740, as indicated by branch "Y". Data of the application service associated with the user session(s) to be migrated are buffered at the further access node, e.g., as explained in connection with step 325 or step 434. This buffering may be performed until the migration of the user session(s) is finalized.

If the delay is not excessive, the method proceeds to step 750, as indicated by branch "N". At step 750, no buffering of the Data of the application service associated with the user session(s) to be migrated is performed.

By performing the buffering in a selective manner as illustrated by the method of FIG. 7, resources required for the buffering may be utilized in an efficient manner.

It is to be noted that the method of FIG. 7 may also be modified to control the buffering in a different manner. In some scenarios, buffering parameters could be adapted depending on the parameter determined at step 720. For example, if the parameter determined at step 720 indicates a larger delay, a buffer size applied for the buffering may be increased.

In the method of FIG. 7, the determination of the parameter at step 720 and the control steps of steps 730, 740, and 750 may be performed by the further access node, i.e., at the target side of the HO. If a processor based implementation of the such access node is used, the steps of the method may be performed by one or more processors of the access node. For this purpose, the processor(s) may execute correspondingly configured program code. Further, at least some of the corresponding functionalities may be hardwired in the processor(s). In some scenarios, the method of FIG. 7 may also be applied in a distributed manner. For example, the determination of the parameter of step 720 could be performed at the source side of the HO, i.e., by the access node, and the determined parameter then be indicated by the access node to the further access node. On the basis of the indicated parameter, the further access node may then perform the control of buffering.

It is to be understood that the methods of FIGS. 5, 6, and 7 may be combined in various ways. For example, the method of FIG. 5 may be applied to control whether the HO message(s) are utilized for transferring the context data, and additionally the method of FIG. 6 may be applied for controlling adaptation of parameters for triggering the HO and/or the method of FIG. 7 may be applied for controlling buffering at the target side.

Figure 8:
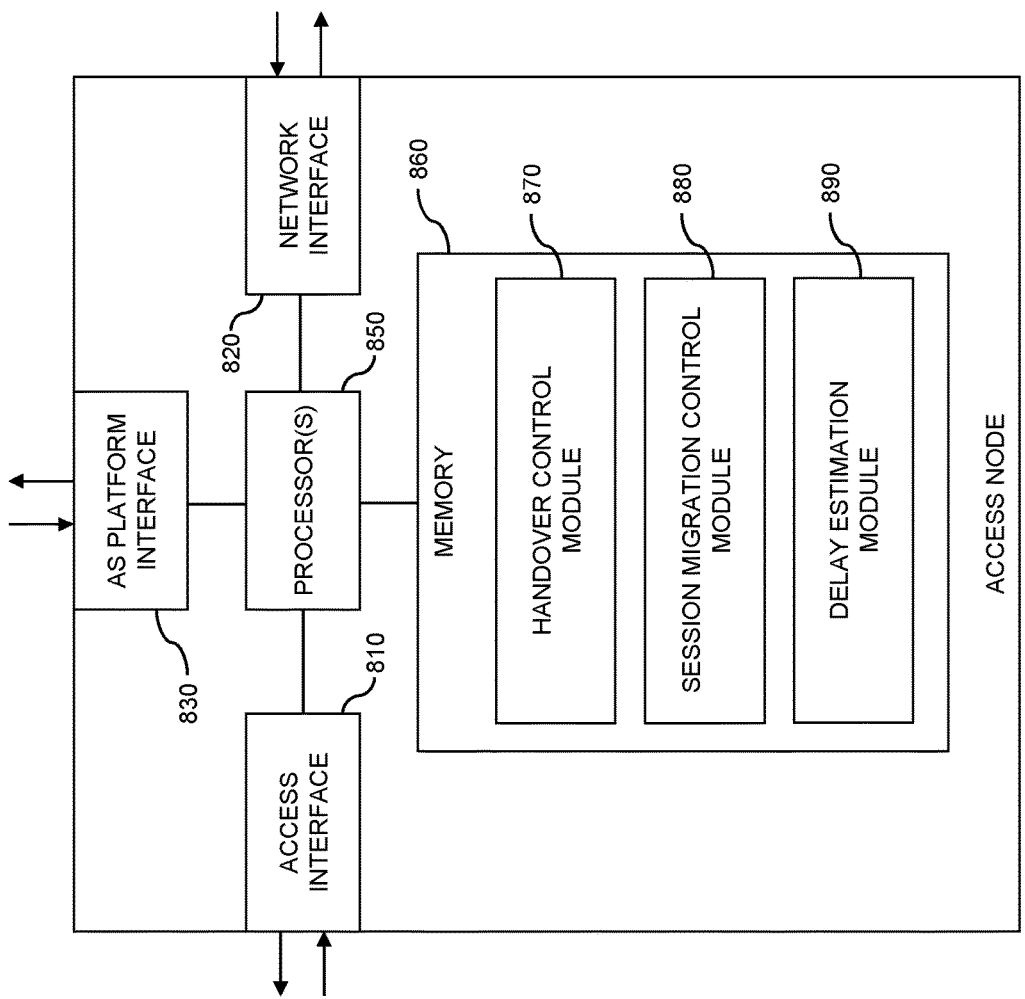
FIG. 8 schematically illustrates an access node according to an embodiment of the invention.

FIG. 8 illustrates exemplary structures which may be used for implementing the above concepts in an access node for a cellular network, e.g., in the access node or further access node of the method of FIG. 5, 6, or 7.

As illustrated, the access node may include an access interface 810 for connecting to one or more UEs, such as the UE 10. If the access node is a base station, the access interface 810 may correspond to a radio interface. If the access node is intended for deployment at a more centralized site within a RAN of the cellular network, the access interface 810 may have the purpose of connecting the access node via a base station of the cellular network to one or more UEs. As further illustrated, the access node may include a network interface 820 for connecting to other nodes of the cellular network. The network interface 820 may for example correspond to the above-mentioned X2 interface or S1 interface. As further illustrated, the access node may include an application service platform interface 830 for connecting to an application service platform, such as the above-mentioned application service platform 150, 150A, or 150B. The network interface 820 may for example correspond to the above-mentioned fourth interface IF4.

Further, the access node includes one or more processors 850 coupled to the interfaces 810, 820, and 830, and a memory 860 coupled to the processor(s) 850. The memory 860 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 860 includes suitably configured program code to be executed by the processor(s) 850 so as to implement the above-described functionalities of the access node. In particular, the memory 860 may include various program code modules for causing the access node to perform processes as described above, e.g., corresponding to the method steps of FIG. 5, 6, or 7.

As illustrated, the memory 860 may include a handover control module 870 for implementing the above-described functionalities of performing HOs from the access node to other access nodes of the cellular network and/or HOs from other access nodes of the cellular network to the access node. These functionalities may in particular include sending of the above-mentioned HO message(s). Further, the memory 860 may include a session migration control module 880 for implementing the above-described functionalities of controlling migration of user sessions of application services between an application service platform at the access node and one or more application service platforms at other access nodes. Further, the memory 860 may include a delay estimation module 890 for implementing the above-mentioned functionalities of estimating the delay associated with transferring the context data in one or more HO message(s) or a parameter indicative of such delay.

It is to be understood that the structures as illustrated in FIG. 8 are merely schematic and that the access node may actually include further components which, for the sake of clarity, have not been illustrated, e.g., further interfaces or processors. Also, it is to be understood that the memory 860 may include further types of program code modules, which have not been illustrated, e.g., program code modules for implementing known functionalities of an access node of a cellular network, e.g., known functionalities of an eNB. According to some embodiments, also a computer program may be provided for implementing functionalities of the access node, e.g., in the form of a physical medium storing the program code and/or other data to be stored in the memory 860 or by making the program code available for download or by streaming.

As can be seen, the concepts as described above may be used for efficiently providing one or more application services to a UE connected to a cellular network. In particular, migration of user sessions of such application services between different application service platforms may be efficiently coordinated with HO processes, while avoiding adversely affecting such HO processes.

It is to be understood that the examples and embodiments as explained above are merely illustrative and susceptible to various modifications. For example, the illustrated concepts may be applied in connection with various radio technologies, without limitation to the above-mentioned example of LTE radio technology. Further, the illustrated concepts may be applied in connection with various kinds of access nodes, including base stations, base station controllers, or transport hub nodes of a RAN. Still further, it is to be understood that depending on the type of utilized radio technology also the utilized interfaces, protocols or messages may vary. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of providing at least one application service to a user equipment via an application service platform at an access node of a cellular network and a further application service platform at a further access node of the cellular network, the method comprising:
   determining a parameter indicative of a delay associated with transfer of context data from the application service platform to the further application service platform in one or more handover messages controlling a handover of the user equipment from the access node to the further access node, the context data being associated with at least one user session of the at least one application service provided to the user equipment; and
   depending on the determined parameter, controlling migration of the at least one user session from the application service platform to the further application service platform by:
      responsive to the parameter indicating that the delay is below a first threshold, initiating transfer of context data of the user equipment in said one or more handover messages; and
      responsive to the parameter indicating that the delay is above a second threshold, initiating transfer of the context data of the user equipment in one or more other messages than said one or more handover messages.

2. The method of claim 1, further comprising, in response to the parameter indicating that the delay is above a third threshold, adapting one or more parameters for controlling triggering the handover to the further access node and initiating transfer of the context data of the user equipment in the one or more handover messages.

3. The method of claim 1, wherein the delay comprises a delay associated with one or more of:
   transferring the context data in the one or more handover messages from the access node to the further access node; and
   transferring the context data from the application service platform to the access node.

4. The method of claim 3, wherein the determining of the parameter comprises measuring the delay associated with transferring the context data from the application service platform to the access node during transferring the context data from the application service platform to the further application service platform.

5. The method of claim 1, wherein the determining of the parameter comprises estimating the delay based on one or more of:
   the at least one application service provided to the user equipment;
   subscription data associated with the user equipment;
   delays experienced in earlier processes of transferring context data in a handover message; and
   a data volume of the context data.

6. The method of claim 1, further comprising the access node determining the parameter and indicating the parameter to the further access node.

7. The method of claim 1, further comprising, depending on the parameter, the further access node controlling buffering of data associated with the at least one application service.

8. An access node for a cellular network, the access node comprising:
   an interface to an application service platform for providing at least one application service to a user equipment; and
   processing circuitry, the processing circuitry configured to:
      determine a parameter indicative of a delay associated with transfer of context data between the application service platform and a further application service platform at a further access node in one or more handover messages for controlling a handover of the user equipment between the access node and the further access node, the context data being associated with at least one user session of the at least one application service provided to the user equipment; and
      depending on the determined parameter, control migration of the at least one user session between the application service platform and the further application service platform by:
         responsive to the parameter indicating that the delay is below a first threshold, initiating transfer of context data of the user equipment in said one or more handover messages; and
         responsive to the parameter indicating that the delay is above a second threshold, initiating transfer of the context data of the user equipment in one or more other messages than said one or more handover messages.

9. The access node of claim 8, wherein the processing circuitry is configured to, in response to the parameter indicating that the delay is above a third threshold, adapt one or more parameters for controlling triggering the handover to the further access node and initiate transfer of the context data of the user equipment in the one or more handover messages.

10. The access node of claim 8, wherein the delay comprises a delay associated with one or more of:
   transferring the context data in the one or more handover messages from the access node to the further access node; and
   transferring the context data from the application service platform to the access node.

11. The access node of claim 10, wherein the processing circuitry is configured to determine the parameter by measuring the delay associated with transferring the context data from the application service platform to the access node during transferring the context data from the application service platform to the further application service platform.

12. The access node of claim 8, wherein the processing circuitry is configured determine the parameter by estimating the delay based on one or more of:
   the at least one application service provided to the user equipment;
   subscription data associated with the user equipment;
   delays experienced in earlier processes of transferring context data in a handover message; and
   data volume of the context data.

13. The access node of claim 8, wherein the processing circuitry is configured to determine the parameter and indicate the parameter to the further access node.

14. The access node of claim 8, wherein the processing circuitry is configured to control, depending on the parameter, buffering of data associated with the at least one application service.

15. A non-transitory computer readable recording medium storing a computer program product for controlling access node of a cellular network, the computer program product comprising software instructions which, when run on processing circuitry of the access node, causes the access node to:
   determine a parameter indicative of a delay associated with transfer of context data from the application service platform to the further application service platform in one or more handover messages controlling a handover of the user equipment from the access node to the further access node, the context data being associated with at least one user session of the at least one application service provided to the user equipment; and
   depending on the determined parameter, control migration of the at least one user session from the application service platform to the further application service platform by:
      responsive to the parameter indicating that the delay is below a first threshold, initiating transfer of context data of the user equipment in said one or more handover messages; and
      responsive to the parameter indicating that the delay is above a second threshold, initiating transfer of the context data of the user equipment in one or more other messages than said one or more handover messages.

* * * * *